July 2, 1968   J. S. TOWNSEND   3,390,717
HEAT TRANSFER DEVICE
Filed Aug. 2, 1966

Jerry S. Townsend,
INVENTOR.
BY.

ATTORNEY.

United States Patent Office 3,390,717
Patented July 2, 1968

3,390,717
HEAT TRANSFER DEVICE
Jerry S. Townsend, Los Angeles, Calif., assignor to TRW Inc., Redondo Beach, Calif., a corporation of Ohio
Filed Aug. 2, 1966, Ser. No. 569,708
2 Claims. (Cl. 165—1)

ABSTRACT OF THE DISCLOSURE

To vary the heat transfer rate between two facing plates having a plurality of discrete particles therebetween, the force and/or distance between the plates is varied.

---

Figure 1:
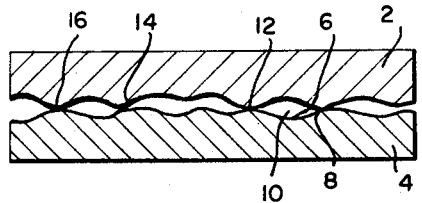

More particularly, this device relates to a heat transfer device in which the rate of heat transfer between two facing plates is increased. This invention also relates to a new and improved thermal switch which can be controlled so as to vary the heat transfer rate between facing plates.

As is well known in the art, there are three basic ways of transferring heat between a heat source and a heat sink. One of these ways is convection in which a fluid such as gas or liquid picks up heat from a source, and through movement of the fluid and contact with a heat sink, transfers heat. Another method of removing heat from a source is by radiation. Finally, a method of transferring heat from one body to another is by conduction. This occurs when one body is in contact with another or where an intermediate body such as gas or liquid or another material is interposed between the two bodies so as to act as a conducting medium.

In space vehicles, the most common method by which heat is dissipated from the vehicle is by radiation from the outer surface of the vehicle. As an example, when electrical components are operating within the space vehicle, heat is generated which must be dissipated so as not to destroy various elements of the space vehicle. When the components are not operating, however, it is often necessary or desirable to store a certain amount of heat within the space vehicle so as not to expose the elements thereof to extremely low or cryogenic temperatures. Thus, it is desirable to provide a device whereby radiation of heat occurs during operation of the various components, while heat is stored during non-operation of the components. In addition, it may be necessary to maintain the components within a specified or desired range of temperatures during operation of the device.

In other applications, including that of space vehicles, it is desirable to provide a maximum heat transfer as between one body and another so as to remove heat from the first body rapidly.

According to this invention, heat transfer, as between two plates, is facilitated by providing a plurality of discreet particles, such as small balls, which are interposed between plates. The plates are forced together, so as to increase the area of contact, whereby to increase the heat transfer between one plate and the other. As an adjunct to this invention, a thermal switch is provided whereby the rate of heat transfer between one body and another is controlled by the force tending to force the bodies together.

Figure 2:
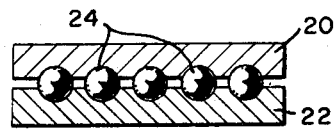
Figure 3:
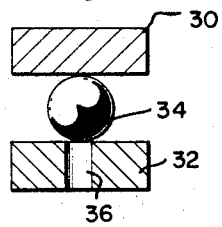
Figure 4:
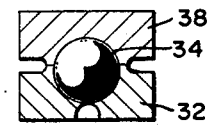
Figure 5:
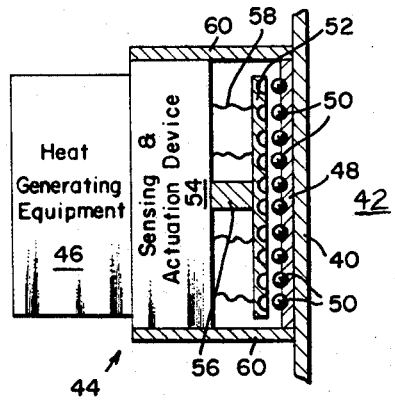

The objects and advantages of this invention will become apparent as this description proceeds, taken in conjunction with the drawing in which:

FIG. 1 is a view in cross section of two flat plate members which is typical of the prior art, FIG. 2 is a view, partially in cross section, of an embodiment of this invention which represents an improvement over that known in the prior art, FIG. 3 is a view, partially in cross section, of one step in forming an embodiment of this invention, FIG. 4 is a view similar to that of FIG. 3 showing the apparatus in an assembled condition, and FIG. 5 is a view, partially in cross section, of a thermal switch which embodies features of this invention.

Referring now to FIG. 1, a typical prior art structure is shown. Thus, a plate 2 is placed in contact with plate 4 with the purpose of conducting heat from plate 2 to plate 4. Even when metallic plates such as plates 2 and 4 are highly polished on their juxtaposed surfaces, it is inevitable that valleys 6 and ridges 8 will occur so as to provide spaces 10 between the plates. Even when the plates are forced together under high pressure, voids are still maintained between the plates such that heat is transferred from plate 2 to plate 4 only through the contacting surfaces such as shown at 12, 14 and 16. Generally speaking, the heat transfer as between one plate or member and another is dependent on the area of contact and the force exerted between the areas of contact. To improve heat transfer, therefore, it is incumbent to either increase the force between the areas of contact or to increase the area of contact. One method of increasing the area of contact as between the two members is to highly polish the flat areas which, if large plates are involved, is an expensive, time consuming and generally unsatisfactory process.

To obviate the disadvantages of the prior art, this invention provides for heat transfer between two plates by interposing a plurality of discreet particles such as balls between the two plates and then forcing the plates together to embed the balls in the plates. This, in effect, increases the area of contact and thus the heat transfer.

Referring to FIG. 2, if plate 20 and 22 have a plurality of balls 24 interposed there between and then the plates 20 and 22 forced together, the balls will embed themselves within plates 20 and 22. Generally speaking, the surfaces of the balls 24 are more readily polished during manufacture than flat surfaces due to the small size of the balls. In any event, the forces tending to bring members 20 and 22 together are such that when the balls are embedded within the various members, a much greater area of contact between the balls and the respective flat members is achieved.

The reason for the greater heat transfer through the use of these balls is believed to be due to the increase in contact area between the respective balls and the flat members as opposed to two flat members facing each other without the balls interposed therebetween. Also, a finer polish is attainable on spheres than on plates. It is evident that each of the balls has an area in contact with each of the plates which is equal to half the area of the ball hemisphere. Were the balls not present, the area of contact, as between the respective plates, would be equal to the projected area of the ball. Thus, the area of contact is greater when balls are used and due to the large localized force of the balls within the sockets of the respective plates, a greater heat transfer can be obtained. While balls or spheres have been described as a preferred embodiment, other shapes can be used. For example, cones and cone shaped receptacles as well as other shapes are within the scope of this invention.

It should be noted that while balls 24 are shown as being spaced apart, this is for illustration purposes only, and in normal course of operation, the balls would be for all practical purposes in point contact with an adjacent ball although some allowance is made for extrusion. In this connection, it is desirable to have the spheres as small as practicable.

FIG. 3 is an illustration of one method of assembling balls within the plates. Thus, body member or plate 30 is forced toward body member or plate 32 so as to squeeze or embed balls 34 within the respective flat members 30 and 32. Within members 32, for each ball employed, there is an aperture 36 which can be drilled or otherwise formed within plate number 32. This aperture serves the purpose of not only centering ball 34 in the proper position, but also when the balls and plates are forced together will facilitate a "flow" of material in plate 32 around ball 34.

In FIG. 4, the plates are shown in an assembled position. In actual operation, plate 30 would first force balls 34 (only one of which is shown for clarity) into aperture 36 so as to partially achieve the condition shown in FIG. 4, then plate 30 would be removed and another plate 38 placed over balls 34 and plate 32 so as to embed balls 34 within the plate. This facilitates the flow of the material around balls 34 so as to further increase the area of contact as between plates 38 and 32. When the plates are finally assembled, aperture 36 will tend to close. By using a first plate and substituting a second plate, the centerline of each of the balls is forced below the surface to plate 32 to lock them in place.

In FIG. 5 there is shown an application of the basic principle of this device and used in a thermal switch. In this device, for illustration purposes, there is shown an outer wall 40 which may comprise, for example, the exterior skin of a space vehicle. Thus, outer space is represented generally at 42 and the interior of the space vehicle at 44. Within the space vehicle, a heat generating device such as an electrical power supply or other device is shown at 46. When this device is operating, it is desirable to dissipate the heat by radiation from skin 40 so as to keep the temperature within the space vehicle below a predetermined amount. When the heat generating equipment is not being used, heat transfer from skin 40 to space 42 should be kept to a minimum so as not to expose the components of the space vehicle to a cold environment as would be experienced if the heat were allowed to readily dissipate. Also, even when the device is operating, it may be necessary to maintain the equipment or vehicle interior at a relatively constant temperature.

A heat transfer plate 48 is provided which is in contact or integral with skin 40 so as to be in relatively good heat transfer relationship therewith. Mounted within plate 48 are a plurality of balls 50 similar to those described with reference to FIGS. 2–4. Another plate 52 is provided which is shown as not contacting balls 50 so that heat transfer between plates 52 and 48 is not readily accomplished. However, when plate 52 is forced against balls 50, a good heat transfer relationship ensues. Plate 52 has cavities for receiving balls 50.

A sensing and actuation device 54 is provided which measures the temperature of the heat generating equipment 46 so as to be responsive thereto and move plate 52 toward or away from balls 50 depending on the temperature. Although not shown, a solenoid is provided within the sensing and actuation device so as to force leg 56 toward or away from plate 48 and hence plate 52 is forced toward or away from balls 50 and plate 48. Heat conducting flexible straps 58 are provided which conduct heat from the heat generating equipment through the sensing and actuation device and thence to plate 52.

In operation, when the heat generating equipment is operated and it is desired to dissipate heat therefrom to the exterior of the vehicle, the sensing and actuation device, through appropriate solenoids or otherwise, will force leg or support 56 and plate 52 toward balls 50 so as to become in contact therewith and to allow a high transfer of heat through the conducting straps 58 through plate 52, through balls 50, through plate 48 and thence radiated outward into space 42 through skin 40.

During nonoperation of the heat generating equipment, or if the temperature drops below a predetermined minimum, then sensing and actuating device 54 operates to withdraw arm 56 and hence plate 52 away from balls 50 and plate 48 so as to temporarily cease the transfer of heat from plate 52 to balls 50. Supports 60 which may comprise an insulating material are provided to hold the assembled parts together. It should be understood, however, that this example is given by way of illustration only and it is not intended that the exact structure must be duplicated to fall within the scope of the claims.

What is claimed is:
1. A device for transferring heat between one element and another which comprises;
    a first plate, said plate being adapted to receive heat from a heat source,
    a second plate, said second plate being adapted to emit heat, said first and second plates being in close juxtaposition to each other,
    a plurality of solid discrete particles interposed between said first and second plates, said particles being partially imbedded in at least one of said plates, and
    means to vary the distance between said first and second plates whereby to vary the rate of heat transfer between said first and second plates.
2. A method of transferring heat from a source to a receiver which comprises;
    providing a first plate,
    placing a plurality of solid discrete particles on said plate,
    providing a second plate in forcible contact with said particles in close juxtaposition to said first plate,
    exposing one of said plates to a source of heat, and
    varying the distance between said plates whereby to vary the rate of heat transfer between said plates.

References Cited

UNITED STATES PATENTS

| | | | |
|---|---|---|---|
| 2,941,759 | 6/1960 | Rice et al. | 244—117 |
| 3,177,933 | 4/1965 | Webb | 165—96 |
| 3,212,573 | 10/1965 | Valyi | 165—185 |
| 3,225,820 | 12/1965 | Riordan | 165—32 |
| 3,301,315 | 1/1967 | Webb | 165—80 |

ROBERT A. O'LEARY, *Primary Examiner.*

C. SUKALO, *Assistant Examiner.*